(12) United States Patent  (10) Patent No.: US 8,943,820 B2
Carlton et al.  (45) Date of Patent: Feb. 3, 2015

(54) METHOD FOR CONTROLLING A PUMP AND MOTOR SYSTEM

(75) Inventors: Douglas J. Carlton, Peoria, IL (US); Corwin E. Storer, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 1291 days.

(21) Appl. No.: 12/634,165

(22) Filed: Dec. 9, 2009

(65) Prior Publication Data

US 2011/0131968 A1  Jun. 9, 2011

(51) Int. Cl.
| F16D 31/00 | (2006.01) |
| B60W 10/06 | (2006.01) |
| B60W 10/103 | (2012.01) |
| B60W 10/30 | (2006.01) |
| B60W 30/188 | (2012.01) |
| F16H 61/472 | (2010.01) |

(52) U.S. Cl.
CPC .............. *F16D 31/00* (2013.01); *B60W 10/06* (2013.01); *B60W 10/103* (2013.01); *B60W 10/30* (2013.01); *B60W 30/1884* (2013.01); *B60W 30/1886* (2013.01); *F16H 61/472* (2013.01); *B60W 2710/0644* (2013.01); *B60Y 2200/41* (2013.01)
USPC ................................................ 60/431; 60/449

(58) Field of Classification Search
USPC ........................................................ 60/449
See application file for complete search history.

(56) References Cited

U.S. PATENT DOCUMENTS

| 3,791,147 | A | * | 2/1974 | Nuss ............................... 60/449 |
| 4,490,619 | A |   | 12/1984 | McMinn |
| 4,864,994 | A |   | 9/1989 | Myers |
| 5,050,379 | A | * | 9/1991 | Nagai et al. ..................... 60/449 |
| 5,592,817 | A | * | 1/1997 | Nishimura et al. ............. 60/431 |
| 6,285,178 | B1 |   | 9/2001 | Ball et al. |
| 6,564,774 | B2 |   | 5/2003 | Ellims et al. |
| 7,053,498 | B1 |   | 5/2006 | Boisvert et al. |
| 7,135,785 | B2 |   | 11/2006 | Kropp et al. |
| 7,459,800 | B2 |   | 12/2008 | Boisvert et al. |
| 7,524,263 | B2 |   | 4/2009 | Johnson et al. |
| 2005/0056021 | A1 |   | 3/2005 | Belokon et al. |
| 2009/0126361 | A1 |   | 5/2009 | Kakizawa et al. |
| 2009/0163318 | A1 |   | 6/2009 | Matsuyama |

FOREIGN PATENT DOCUMENTS

| JP | 07021362 | 3/1995 |
| JP | 2009159739 | 7/2009 |
| JP | 2009240084 | 10/2009 |

* cited by examiner

*Primary Examiner* — F. Daniel Lopez
(74) *Attorney, Agent, or Firm* — Baker Hostetler

(57) ABSTRACT

A method of controlling a pump and motor system having at least one of a variable displacement pump and a variable displacement motor. The method may comprise providing an engine drivingly coupled to a primary load and a secondary load, the secondary load being driven by the pump and motor system. The method may also comprise sensing a change in engine speed in response to a change in the primary load. The method may further comprise changing the engine speed to compensate for the primary load change. The method may further comprise changing a displacement of the at least one variable displacement pump and the variable displacement motor to maintain a constant secondary load.

7 Claims, 2 Drawing Sheets

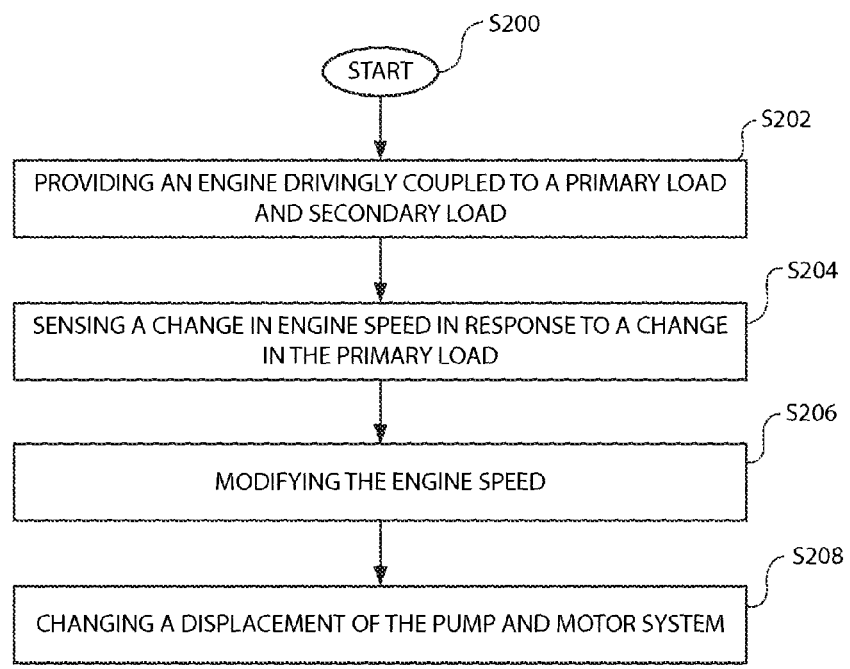

METHOD FOR CONTROLLING A PUMP AND MOTOR SYSTEM

TECHNICAL FIELD

The present invention relates to a method for controlling a pump and motor system, and more specifically to a method for controlling a pump and motor system to maintain a constant secondary load.

BACKGROUND

Machines such as, for example, compactors, pavers, dozers, loaders, excavators, motor graders, and other types of heavy machinery have different loads to be driven, which may be called as primary load and secondary load. It is known to use an engine to drive the primary load and a pump and motor system to provide the power for the secondary load. The pump and motor system may receive an output from the engine and transfer the power to the secondary load.

When the primary load driven by the engine changes, the output from the engine may change accordingly. As a result, such change may also cause the pump and motor system to change. In this situation, it may be desirable to compensate for the change in the pump and motor system to maintain a constant power output.

U.S. Pat. No. 4,490,619 issued to McMinn ("619 patent"), discloses a hydraulic driven electric generator and air conditioning system for simultaneously generating controlled quality electrical power and producing air conditioning in a desired area. The system includes a variable displacement hydraulic pump driven by a prime engine for driving the generator. The generator includes a speed pickup sensor for sensing the speed of the generator and responsively controlling the variable displacement pump to maintain a constant generator speed.

The '619 patent may compensate for the changes in generator speed, but it does not sense a change in engine speed based on a change in a primary load, change the engine speed to compensate for the primary load change, and then change a displacement of a pump to maintain a constant secondary load. Thus, the '619 patent does not maintain both a primary load and a secondary load in desired manners.

The present disclosure is directed at overcoming one or more of the problems or disadvantages in the prior art control systems.

SUMMARY OF THE DISCLOSURE

In one aspect, the present disclosure is directed to a machine. The machine comprises an engine and a primary load drivingly coupled to the engine. The machine also may comprise a pump drivingly coupled to the engine, which is operatively connected to a motor, at least one of the pump and the motor having a variable displacement. The machine may also comprise a secondary load drivingly coupled to the motor. The machine may also comprise a controller in communication with the engine and at least one of the pump and the motor and configured to sense a change in engine speed in response to a change in the primary load, modify the engine speed in response to the sensed change in engine speed, and change a displacement of the at least one of the pump and the motor to maintain a constant output to drive the secondary load.

In another aspect, the present disclosure is directed to a method of controlling a pump and motor system having at least one of a variable displacement pump and a variable displacement motor. The method may comprise providing an engine drivingly coupled to a primary load and a secondary load, the secondary load being driven by the pump and motor system. The method may also comprise sensing a change in engine speed in response to a change in the primary load. The method may further comprise changing the engine speed to compensate for the primary load change. The method may further comprise changing a displacement of the at least one variable displacement pump and the variable displacement motor to maintain a constant output to drive the secondary load.

In yet another aspect, the present disclosure is directed to a method of controlling a pump and motor system having at least one of a variable displacement pump and a variable displacement motor. The method may comprise providing an engine drivingly coupled to a primary load and a secondary load, the secondary load being driven by the pump and motor system. The method may further comprise sensing a change in engine speed in response to a change in the primary load. The method may further comprise increasing the engine speed in responsive to the primary load increase, and decreasing a swash plate angle of the at least one variable displacement pump and the variable displacement motor to maintain a constant secondary load.

BRIEF DESCRIPTION OF THE DRAWINGS

FIG. 2 is a flowchart representation of control logic of a pump and motor system according to an exemplary disclosed embodiment.

DETAILED DESCRIPTION

Figure 1:
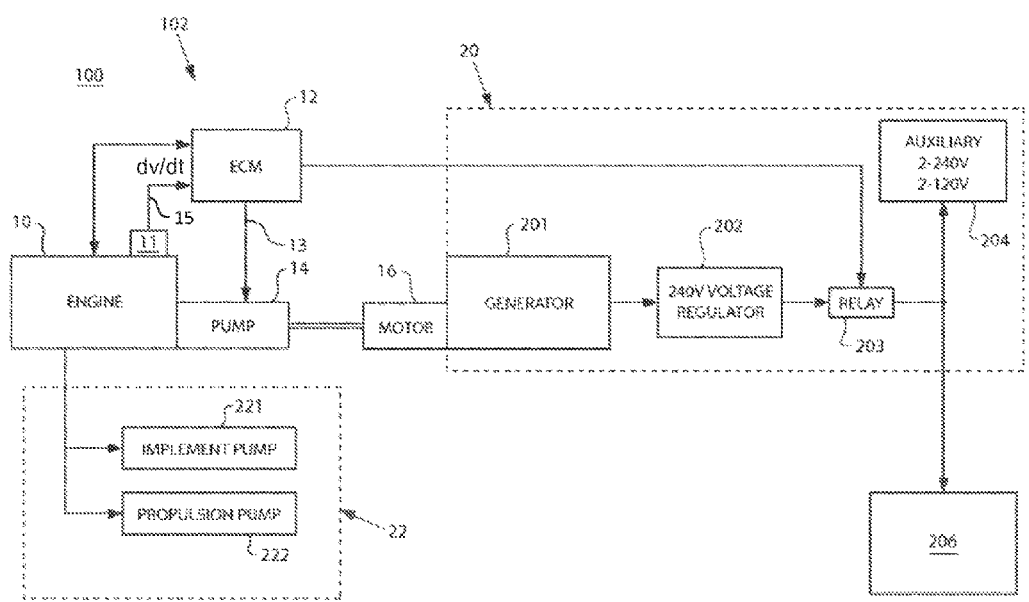
FIG. 1 is a diagrammatic illustration of a machine having a pump and motor system according to an exemplary disclosed embodiment.

Referring now to the drawings, wherein an exemplary embodiment of a method for controlling a pump and motor system 102 is shown, FIG. 1 shows a diagram of one embodiment of the present disclosure. Referring to FIG. 1, machine 100 may include engine 10 to provide a power source, such as a diesel engine, a gasoline engine, a natural gas engine, a hydrogen engine, or any other engine apparent to one skilled in the art.

Engine 10 may produce power and transmit that power to different loads. As shown in FIG. 1, primary load 22 may be drivingly coupled to engine 10. Primary load 22 may include, for example, implement pump 221 and propulsion pump 222. Implement pump 221 may convert the power to propel machine implement tools, such as a tool device for performing various tasks including, for example, buckets, compactors, forked lifting devices, brushes, or other suitable devices as desired for accomplishing particular tasks. Propulsion pump 222 may provide motive power for the machine 100.

A pump 14 may be drivingly coupled to engine 10. In one embodiment, pump 14 may be directly connected to engine 10 via an input shaft (not shown). Alternatively, pump 14 may be connected to engine 10 via a torque converter, a gearbox, or in any other manner known in the art. In addition, pump 14 may be a hydraulic pump, converting the power produced by engine 10 into a different form, and pump fluid to drive motor 16, which may be operatively connected with pump 14.

Pump 14 may be a variable displacement pump. Alternatively, motor 16 may be a variable displacement motor. Secondary load 20 may be coupled to motor 16. Motor 16 may drive generator 201 to generate electrical power. Output from generator 201 may be regulated, for example, by regulator 202. Regulated electrical power may be selectively supplied by relay 203 to auxiliary electrical power source 204, which may be used to provide electrical power to devices 206. Devices 206 may be any type and quantity of electrically powered devices such as, for example, heaters.

Referring to FIG. 1, controller 12 may be in communication with engine 10 and pump 14, pump 14 being a variable displacement pump. Controller 12 may be configured to sense a speed change of engine 10 caused by a change in the primary load 22. Speed sensor 11 may be coupled to engine 10 for detecting the speed change of engine 10 and inputting such change to controller 12. If there is any speed change of engine 10, controller 12 may further be configured to modify the speed of engine 10 in a desired manner. Controller 12 may be also configured to change a displacement of pump 14 to maintain a desired output to drive the secondary load 20. In one embodiment, if the primary load 22 increases, controller 12 will increase the speed of engine 10 to compensate. In order to maintain the desired output to drive the secondary load 20, controller may change the displacement of pump 14 by decreasing a swash plate angle (not shown) of the pump 14, as is well known in the art.

Alternatively, pump 14 may be fixed displacement and motor 16 may be a variable displacement motor. FIG. 1 in this configuration would indicate a control line connection 13 from the controller 12 to the motor 16 rather than the currently indicated control line connection 13 from the controller 12 to the pump 14. In this situation, controller 12 may maintain desired secondary load 20 by decreasing the swash plate angle of motor 16.

In an alternative situation, if primary load 22 decreases, engine speed may increase. Controller 12, in response to increased engine speed, may decrease engine speed to compensate and may subsequently increase the swash plate angle of pump 14 or motor 16 to maintain a constant secondary load 20.

FIG. 2 shows an exemplary flowchart of the control logic according to the present method. S200 starts the control method. The method may include step S202 of providing engine 10 drivingly coupled to primary load 22 and secondary load 20. Step S204 includes sensing a speed change of engine 10 in response to a change in the primary load 22. In step S206, modifying the speed of engine 10 is performed. In one embodiment, speed of engine 10 will be increased if primary load 22 increases. On the other hand, if primary load 22 decreases engine speed may be decreased. To maintain a desired secondary load 20, step S208 includes changing the displacement either of pump 14 or motor 16.

As discussed above, at least one of pump 14 and motor 16 may be variable displacement. In one embodiment of a variable displacement pump, if the primary load is an increase, the engine speed should be increased and the swash plate angle of the pump 14 or motor 16 will be decreased to maintain a constant secondary load.

Industrial Applicability

The disclosed controlling method may be applicable to any system or machine that includes pump and motor system having a variable displacement. In particular, the disclosed method may maintain a constant secondary load regardless of changes in engine speed. Operation of the disclosed method is summarized below.

A power source, such as an engine, may drive a primary load directly. A controller may be in communication with the engine. A pump and motor system may be applied to transfer a portion of the power generated by the engine and drive a secondary load. A speed sensor may be additionally coupled to the engine to detect engine speed change.

If the primary load changes, for example, increases, engine speed will tend to decrease. Engine speed sensor may sense the decrease in engine speed and provide input to a controller. The controller may increase the engine speed to compensate for the decrease, and change a displacement of either the pump or the motor. In this case, the swash plate angle of the pump or the motor will be decreased to maintain a constant secondary load. On the other hand, if the primary load is decreasing, the engine speed may tend to increase and the controller may decrease the engine speed. The controller may then increase the swash plate angle of the pump or the motor to maintain a constant secondary load.

The present disclosure is constructed such that a constant secondary load can be maintained without high cost or complex configuration. An example of a machine suited for use with the above method may include an asphalt paving machine, which must maintain constant electrical power to heaters for proper operation. Other machines may have need for secondary loads that are maintained in a constant state regardless of changes in primary loads or in engine speeds.

It will be apparent to those skilled in the art that various modifications and variations can be made in the disclosed embodiments without departing from the scope of the disclosure. Other embodiments of the present disclosure will be apparent to those skilled in the art from consideration of the specification and practice disclosed herein. It is intended that the specification and examples be considered as exemplary only, with a true scope of the disclosure being indicated by the following claims and their equivalents.

What is claimed is:

1. A machine comprising:
    an engine;
    a primary load drivingly coupled to the engine;
    a pump drivingly coupled to the engine, the pump operatively connected to a motor, at least one of the pump and the motor having a variable displacement;
    a secondary load, including a generator, drivingly coupled to the motor;
    a sensor configured to detect a speed change of the engine;
    a controller including control logic, being in communication with the sensor, the engine and at least one of the pump and the motor;
    the controller operating to receive input from the sensor of a sensed change in engine speed in response to a change in load of the primary load;
    the controller further configured to generate a signal to modify the engine speed in response to the sensed change in engine speed to compensate for the change in engine speed; and
    the controller further configured to generate a signal sent over a control line connection to change a displacement of the at least one of the pump and the motor to maintain a constant output to drive the secondary load in response to the sensed change in engine speed,
    wherein the sensor is separate from the controller.

2. The machine of claim 1, wherein the sensor is an engine speed sensor configured to sense a change in engine speed.

3. A method of controlling a pump and motor system having at least one of a variable displacement pump and a variable displacement motor, comprising:
    providing an engine drivingly coupled to a primary load and a secondary load, the secondary load, including a generator, being driven by the pump and motor system;
    providing a sensor configured to detect a speed change of the engine;

providing a controller configured with control logic, being in communication with the sensor, the engine, and the pump and the motor system;

sensing a change in engine speed in response to a change in the primary load with the sensor;

receiving, utilizing the control logic of the controller, the change in engine speed sensed by the sensor;

generating a signal to modify, utilizing the control logic of the controller, the engine speed in response to the sensing a change in engine speed to compensate for the change in engine speed; and genenerating a signal and sending the signal over a control line connection, utilizing the control logic of the controller, to change a displacement of at least one of the variable displacement pump and the variable displacement motor of the pump and the motor system in response to the change in engine speed sensed by the sensor to maintain a constant output to drive the secondary load, wherein the sensor is separate from the controller.

4. The method of claim 3, wherein changing a displacement includes changing a swash plate angle of the at least one variable displacement pump and the variable displacement motor.

5. The method of claim 4, wherein the sensing a change in engine speed comprises sensing a decrease in engine speed, changing the engine speed includes increasing the engine speed, and changing a swash plate angle includes decreasing the swash plate angle.

6. The method of claim 4, wherein sensing a change in engine speed comprises sensing an increase in engine speed, changing the engine speed includes decreasing the engine speed, and changing a swash plate includes increasing the swash plate angle.

7. A method of controlling a pump and motor system having at least one of a variable displacement pump and a variable displacement motor, comprising:

providing an engine drivingly coupled to a primary load and a secondary load, the secondary load, including a generator, being driven by the pump and motor system;

providing a sensor configured to detect a speed change of the engine;

providing a controller configured with control logic, being in communication with the sensor, the engine, and the pump and the motor system;

sensing a decrease in engine speed in response to an increase in the primary load with the sensor;

receiving, utilizing the control logic of the controller, the change in engine speed sensed by the sensor;

generating a signal to increase, utilizing the control logic of the controller, the engine speed in response to the sensing a decrease in engine speed to compensate for the change in engine speed; and generating a signal and sending the signal over a control line connection to decrease, utilizing the control logic of the controller, at least one of a swash plate angle of the variable displacement pump and a displacement of the variable displacement motor of the pump and motor system in response to the sensed change in engine speed to maintain a constant output to drive the secondary load, wherein the sensor is separate from the controller.

* * * * *

UNITED STATES PATENT AND TRADEMARK OFFICE
CERTIFICATE OF CORRECTION

PATENT NO. : 8,943,820 B2  Page 1 of 1
APPLICATION NO. : 12/634165
DATED : February 3, 2015
INVENTOR(S) : Carlton et al.

It is certified that error appears in the above-identified patent and that said Letters Patent is hereby corrected as shown below:

Specification

Column 3, lines 11-12, delete "inputting such" and insert -- inputting 15 such --.

Column 3, line 55, delete "Industrial Applicability" and insert -- INDUSTRIAL APPLICABILITY --.

Claims

Column 5, line 12, in Claim 3, delete "genenerating" and insert -- generating --.

Signed and Sealed this
Seventeenth Day of November, 2015

Michelle K. Lee
*Director of the United States Patent and Trademark Office*